United States Patent [19]

Maranell

[11] 4,049,905
[45] Sept. 20, 1977

[54] INSULATOR FOR ELECTRIC FENCES

[75] Inventor: Melvin C. Maranell, St. Bonifacius, Minn.

[73] Assignee: Sta-Tite Corporation, St. Bonifacius, Minn.

[21] Appl. No.: 671,336

[22] Filed: Mar. 29, 1976

[51] Int. Cl.² .......................................... H01B 17/16; A01K 3/00
[52] U.S. Cl. .......... 174/163 F; 24/230.5 TP 174 175;
[58] Field of Search ............ 174/158 F, 161 F, 163 F, 174/170, 175; D26/10; 24/73 SA, 73 AP, 115 J, 129 R, 129 D, 230.5 AD, 230.5 TP, 236, 237, 255 R, 255 BS, 255 C; 248/74 R, 74 A, 353; 256/10, 47, 48, 50, 51, 52, 58

[56] References Cited

U.S. PATENT DOCUMENTS

| 1,206,812 | 12/1916 | Callaway | 256/48 |
| 1,356,991 | 10/1920 | Lane | 256/50 |
| 2,870,245 | 1/1959 | Malme | 174/175 |

FOREIGN PATENT DOCUMENTS

| 2,146,807 | 3/1973 | Germany | 256/10 |
| 754,049 | 8/1956 | United Kingdom | 174/158 F |
| 754,239 | 8/1956 | United Kingdom | 174/158 F |

Primary Examiner—Laramie E. Askin
Attorney, Agent, or Firm—Williamson, Bains, Moore & Hansen

[57] ABSTRACT

An insulator mountable on a fence post and capable of supporting and retaining an electrically conductive fence wire comprises an insulator body formed of insulative material and having a face adjacent the forward end and fence post retaining means at the rear end for mounting the insulator on a fence post. The insulator body includes a fence wire retaining hook fixed to and extending forwardly from the face and having a generally spiral configuration as it extends forwardly from, downwardly and rearwardly toward the face so as to define a hook in which a fence wire may be retained. The insulator body includes a reinforcing member fixed to and extending outwardly from the face and being closely spaced from and confronting the wire retaining hook. The hook is formed of elastically flexible material so as to be movable between a rest position adjacent the face and extended positions wherein the hook contacts and bears against either the reinforcing member or the face, thereby withstanding forces applied to the hook through the fence wire by livestock pushing or pulling on the wire. A novel locking portion is provided at the terminal end of the spiral hook to facilitate insertion and removal of a fence wire, and guide and lock means are provided on the reinforcing member to facilitate insertion and retention of the fence wire.

9 Claims, 6 Drawing Figures

U.S. Patent  Sept. 20, 1977  4,049,905
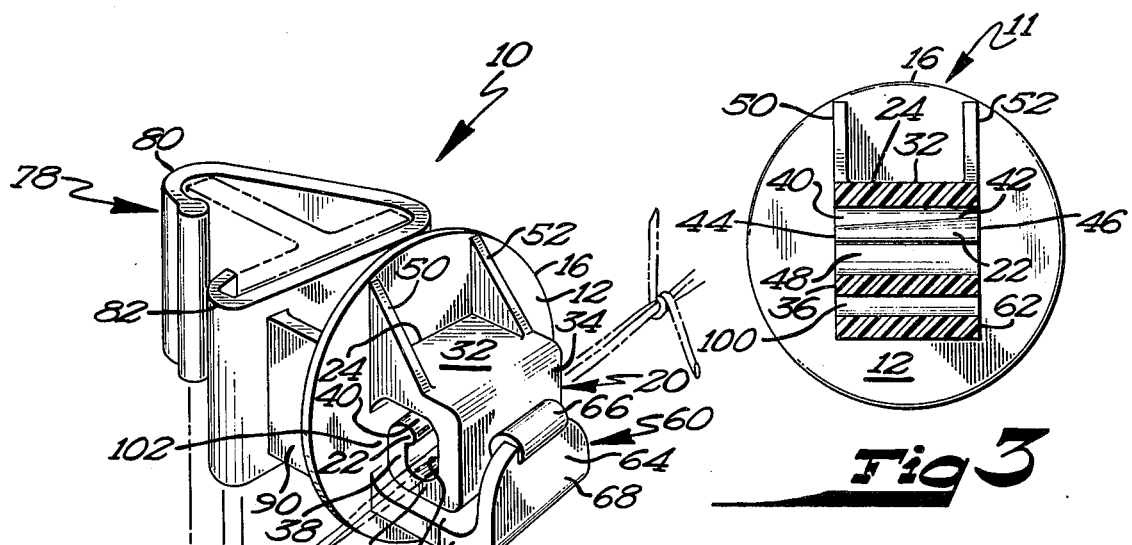
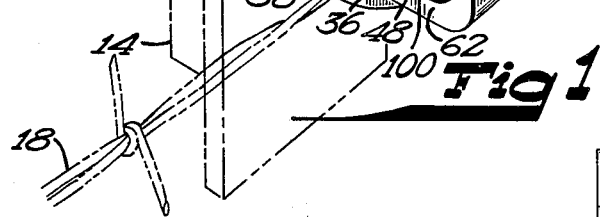
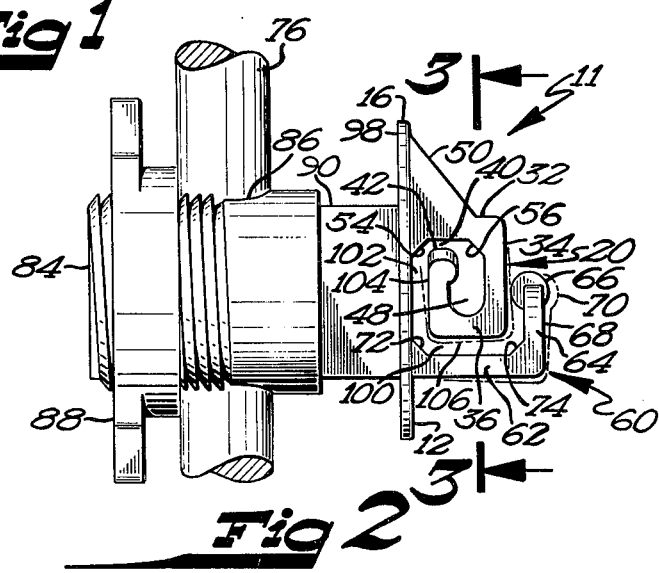
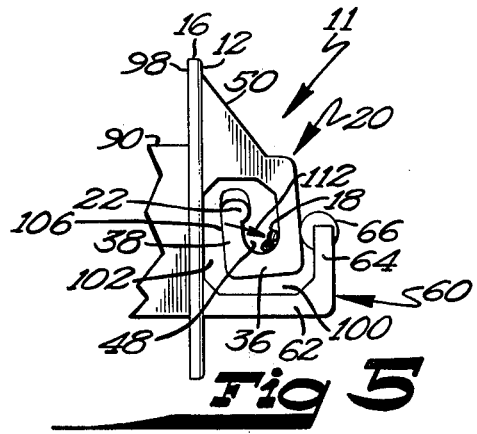
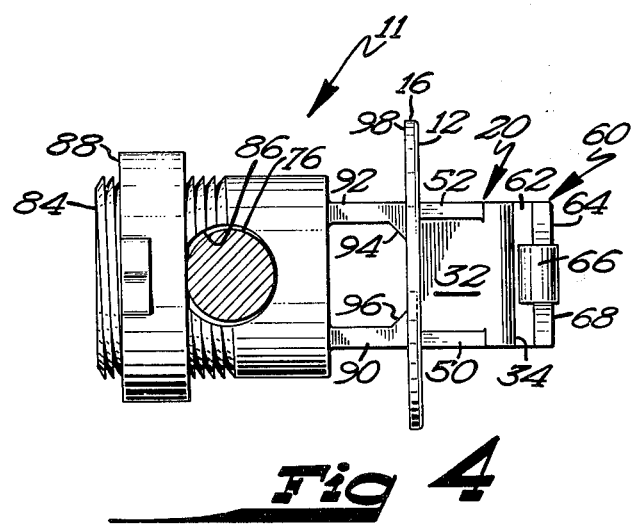
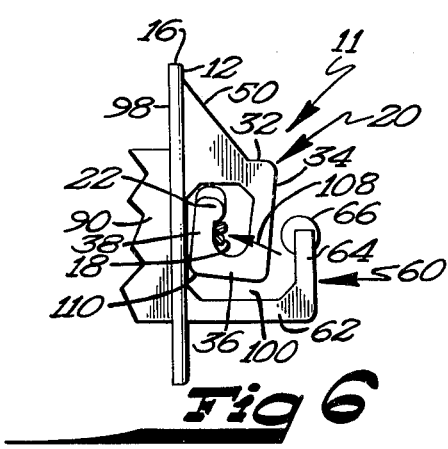

INSULATOR FOR ELECTRIC FENCES

BACKGROUND OF THE INVENTION

The invention relates to the field of fence post insulators and comprises a structure which may be readily attached on commercially available fence posts and is designed to greatly facilitate insertion and retention of the fence wires and to increase greatly the endurance of the insulator to the pushing and pulling forces of livestock frequently exerted on electric fence lines.

The use of electric fences for containment of livestock is becoming increasingly popular, and in recent years the average length of fence lines has increased substantially, resulting in a need for improved wire supporting insulators to minimize the otherwise substantial task of keeping such fence lines operational. When extremely long fence lines are utilized, it can be difficult to isolate an electrical short or other failure, and it is desirable that minimal inspection and maintenance be required to keep the fence in operating condition.

Most commercially available electric fence insulators are formed of plasitc or plastic-like material and typically have a face with a pair of fence wire retaining fingers, one finger extending outwardly and downwardly from the face and the second finger extending outwardly and upwardly to retain the wire therebetween. Typically, the fence wire must be oriented vertically, inserted between the fingers, and then twisted through an arc of 90° in order to be retained by the fingers. Such insertion and twisting is fairly simple when either the insulator or the fence wire is movable and not yet installed on the post or tightened, respectively, but the task of removing or replacing a damaged insulator which is already installed in a completed fence line is substantially more difficult. Accordingly, in view of the hundreds of insulators often needed for a single fence, it would be desirable to provide an insulator with which the fence wire may be easily inserted or removed, even after the insulator is installed on a fence post.

Adding to the difficulty of maintaining an electric fence line is the continually recurring problem of livestock running or walking into the fence, leaning against the fence, or becoming caught on the fence, with the resultant increased wear on the insulators. The problem becomes more acute if barbed wire is used on the fence line and cattle become caught on the barbs.

An electric fence line will occasionally become inoperative due to dirt accumulation between insulators and fence posts, excessive moisture, ice or snow conditions, or shorting due to weeds or grass growing against or falling over the fence wire. Because of these problems, it has frequently been found desirable to use barbed wire on the fence line to discourage livestock pushing against or leaning on the wire when the fence is not energized. When barbed wire is used, however, the livestock are more easily caught or engaged by the barbed fence and additional pulling forces are applied to the insulators when an animal tries to disengage its coat from the barbs. The pushing and pulling action of the fence wire against the insulator can shorten the use life of insulators and it is desirable to provide an insulator which is constructed to absorb much of the pushing and pulling impact from such livestock action and then return to its original wire holding position to thereby increase the use life of the insulator and improve overall performance and reliability of the fence line.

SUMMARY OF THE INVENTION

The invention comprises an insulator for electric fences and usable on substantially and type of commercially available fence post, for the supporting and retaining of an electrically conductive fence wire. The device utilizes an insulator body formed of insulative plastic or plasticlike material, the body having fence post mounting means adjacent one end and a face at the opposite end. A fence wire retaining hook and a reinforcing member are fixed to and extend forwardly from the face.

The fence wire retaining hook preferably has a generally spiral configuration with a first segment extending outwardly, cantileverly from its junction with the face and second, third, and fourth segments extending downwardly, rearwardly and upwardly, respectively, returning toward the face with the terminal end of the spiral being closely spaced from the face and from the junction of the face and the first segment. The hook is formed of elastically flexible material so as to be movable between a rest position adjacent the face and first and second extended positions.

The insulator body also has a reinforcing member fixed to and extending outwardly from the face, the reinforcing member being closely spaced from and confronting the wire retaining hook and at least partially encompassing the hook. The reinforcing member has a roller adjacent its end and the member is formed of elastically flexible material, permitting the member to be moved from an initial position, where the roller closely confronts the hook and has a distance of separation therefrom less than the thickness of a fence wire, and an extended position where the distance of separation between the roller and the hook is increased sufficiently to permit a fence wire to be slipped past the roller by sliding and rolling movement permitting easy insertion of the fence wire. After insertion, the reinforcing member returns to its closely spaced initial position.

The terminal end of the wire retaining hook has a locking portion thereon which is spaced from the first segment of the hook to define an insertion slot therebetween, the slot having a width less than the thickness of a fence wire when the hook is in rest position, and having an increased width when the locking portion is away from the first segment to permit insertion of the wire through the slot. The locking portion has an angled surface resulting in the width of the insertion slot being greater at one lateral side of the hook than at the other to thereby permit a wire to be first inserted at one edge and then worked along and through the slot, using the wire as a wedge to urge it through the slot and into an inner chamber.

After the wire has been inserted within the wire retaining hook and is retained in the inner chamber, the structure of the insulator virtually precludes the accidental escape of the wire and when livestock push or pull on the fence, the wire transmits its forces to the wire retaining hook which moves in response to the forces and bears against the face or against the reinforcing member, thereby cooperating with the face or reinforcing member, respectively, to prevent excessive bending of the wire retaining hook and the loss of the wire.

The invention provides an improved, long-lasting insulator which is highly resistant to repeated pushing or pulling of livestock on the fence and in addition eliminates the problem of inserting a taut wire into an insulator after the insulator has been installed on a fence post. Accordingly, the insulator is particularly valuable as a replacement insulators in already installed fence lines where defective or inadequate insulators are now in use because the new insulator will receive the fence wire without first loosening the fence wire or alternatively without the need for first attaching the fence wire to the insulator and then attempting to stretch the already taut wire to mount the insulator on the fence post.

These and other advantages of the present invention will be apparent from the appended drawing and the following description, wherein like reference numerals on the several views identify like elements of the invention.

BRIEF DESCRIPTION OF THE DRAWINGS

FIG. 1 is a perspective view of an embodiment of the insulator invention shown mounted on a T-post.

FIG. 2 is a side elevation view of a variation of the insulator invention shown mounted on a round post.

FIG. 3 is a cross sectional front elevation view of the insulator of FIG. 2 taken in the direction of arrows 3—3 of FIG. 2.

FIG. 4 is a top elevation view of the insulator of FIG. 2.

FIG. 5 is a partial side elevation view of the insulator of FIG. 2 showing the wire retaining hook in an extended position.

FIG. 6 is a side elevation view of the insulator of FIG. 2 showing the wire retaining hook in a second extended position.

DESCRIPTION OF THE PREFERRED EMBODIMENT

Referring now to FIGS. 1–4 of the drawings, an insulator 10 or 11 embodying the invention has an integral insulator body composed of insulative material such as an enduring plastic or plastic-like material. The insulator 10 or 11 has a face 12 at the front of the insulator, the face being preferably flat and disk-like so as to provide a mounting surface and, when extended radially outwardly, defines a flashguard 16 which provides additional electrical isolation between a conductive fence wire 18 and a fence post 14 or 76 to which the insulator 10 or 11, respectively, is mounted. Preferably, the flashguard 16 is of a generally elliptical or circular configuration.

Extending generally forwardly, outwardly from the face 12 is a fence wire retaining hook 20 which has a generally spiral configuration commencing at its junction 24 with the face 12 and extending outwardly cantileverly from the face with its terminal end 22 being closely spaced from the junction 24. The hook 20 is formed of elastically flexible plastic or plastic-like material and is of a thickness which permits the hook 20 to be flexibly movable between a rest position 104 (FIG. 2) and either of two extended positions 106 or 110, shown in FIGS. 2 and 6 respectively.

The wire retaining hook 20 includes a first segment 32 which is fixed to and extends outwardly from the face 12 and is generally horizontal when the insulator is in position on a fence post. A second segment 34 is fixed to and extends transversely, downwardly from the first segment 32 and follows the general plane of the face 12 although it need not be parallel thereto. A third segmemnt 36 is fixed to and extends transversely from the second segment 34 toward the face 12 and is generally horizontal when the insulator is in position on a fence post. A fourth segment 38 includes the already described terminal end 22 and is fixed to and extends transversely, upwardly from the third segment 36, is spaced forwardly from the face 12 and is closely spaced from the first segment 32 to define a wire insertion slot 40 between the terminal end 22 and the segment 32, permitting the insertion or removal of a fence wire through the slot.

The terminal end 22 of the hook is generally contoured in cross section, as best shown in FIGS. 3-6, to define a ramp to facilitate sliding and rolling movement of the fence wire through the slot 40 and into the chamber 48 for insertion of the wire.

Referring now to FIGS. 2 and 3, the terminal end 22 of the fourth segment 38 includes a locking portion 42 which confronts the lower surface of first segment 32 with the distance of separation between the locking portion and the first segment 32 decreasing from a maximum separation at the lateral side 44 to a minimum separation at the lateral side 46 by means of a steady upward taper of the locking portion between the lateral sides. The distance of separation between the first segment 32 and the locking portion 42 at lateral side 44 is less than the thickness of the fence wire 18 to be retained in the wire retaining hook and the described locking portion 42 is tapered or angled relative to the first segment 32 so as to cause the width of the insertion slot 40 to easily receive the fence wire 18 at lateral side 44, thereby permitting the operator to roll and slide the wire along the locking portion from the face 12, gradually wedging it past the locking portion and into an inner wire retaining chamber 48. Thus a wire positioned between the face 12 and the fourth segment 38 may be lifted into contact with the lower surface of the first segment 32 and then by a combination of rolling and sliding movement whereby the fence wire first contacts the locking surface 42 at the lateral side 44 and then gradually is worked inwardly toward the chamber 48 and along the locking surface toward side 46, the locking surface acts as a wedge or ramp to aid in inserting the wire.

A pair of spaced apart, generally upright gussets 50 and 52 serve as support means and are fixed to and extend between the face 12 and the first segment 32 to inhibit movement of the segment 32 in directions transverse to the generally outward, forward direction of the segment 32.

To provide further support to the wire retaining hook 20, a fillet 54, extends between the lower side of the first segment 32 and the face 12, as best shown in FIG. 2. In addition, a fillet 56 is provided and extends between the first segment 32 and the second segment 34 and lies wholly within the wire retaining chamber 48. The fillets 54 and 56 provide a means for controlling and limiting the movement of the wire retaining hook 20 toward either of the extended positions 106 or 110 described hereafter.

Referring now to FIGS. 1 and 2, a hook reinforcing member 60 is fixed to and extends outwardly from the face 12 and is generally closely spaced from and confronts the wire retaining hook 20 and at least partially encompasses the hook. The reinforcing member includes an elongated arm 62 which extends generally horizontally outwardly from the face 12 and is spaced from the third segment 36 of the hook. Fixed to and extending transversely and generally upwardly from the arm 62 is a reinforcing bar 64 which is positioned closely adjacent the second segment 34 of the hook and terminates at its upper end in a generally arcuate roller 66 which defines combined guide and lock means which assist in inserting and removing a wire 18 past the reinforcing bar 64 and also retains the wire within the insulator. The roller 66 is preferably cylindrical in shape, with the center axis of the cylinder being offset from the exact center of the reinforcing bar 64 and toward the hook with the distance of separation between the periphery of the roller 66 and the second segment 34 being less than the thickness of the wire to be contained.

The reinforcing member 60 is formed of elastically flexible material and is movable from the shown initial position 68 to the extended position 70, the member returning to position 68 when no longer forced outwardly to position 70 by a wire being inserted past roller 66. Fillets 72 and 74 provide structural reinforcement to the reinforcing member 60, fillet 72 extending between arm 62 and face 12 and the fillet 74 extending between arm 62 and bar 64.

The insulator body also includes fence post mounting means for retaining the insulator body on a fence post such as the fence post 14 (FIG. 1) which is of generally T-shaped cross section, or alternatively the circular cross section rod post 76 (FIGS. 2 and 4). The fence post mounting means 78, which is adapted for mounting on a post having a T-shaped cross section, comprises a strap-like plastic body whose curved end flanges 80 and 82 encompass the edges of the post and is well known to the art. The fence post mounting means shown in FIGS. 2-4 is also known to the art and comprises a threaded bolt 84 having a transverse, generally upright fence post receiving aperture 86 through which the post 76 is inserted. A rotatable nut 88 is threaded onto the bolt 84 tightly against the post 76 to mount the insulator body to the post. In view of the fence post mounting means shown in FIGS. 2-4 being well known to the art, no further description thereof will be presented. It should be understood, however, that the particular fence post mounting used with the insulator invention shown herein is not of great importance and any fence post mounting means which permits the insulator body to be attached to a fence post is usable therewith and within the purview of the invention.

Support brackets 90 and 92 extend generally forwardly from the fence post mounting means to the rearward side 98 of the flashguard 16 and are fixed thereto. Fillets 94 and 96 extend between the supports and the rearward side 98 of the flashguard to inhibit lateral bending of the insulator.

In operation, the insulator 10 is first inserted on the fence post either by snapping the mounting means 78 of FIG. 1 around the fence post or, alternatively for insulator 11, by sliding the insulator body (FIG. 2) over the rod post 76 and tightening the nut 88 to secure the insulator to the post. While but two different mounting means have been shown herein, it should be understood that any known means for mounting an insulator to a fence post may be used with the invention and is within its purview.

After attaching the insulator body to the fence post, the fence wire 18 is next inserted in the insulator 10 or 11 by an operator gripping the wire, orienting the wire approximately horizontally and then forcibly sliding and rotating the wire about its axis in a downward direction past the combined guiding and locking means formed by the roller 66 and into channel 100. As in the fence wire moves downwardly between the second segment 34 and the roller 66, the flexibly movable reinforcing member 60 is urged outwardly from the initial position 68 to the extended position 70, thereby making it easier for the fence wire to be slipped past the roller 66. The arcuate cross section of roller 66 permits the wire to be more readily rotated and slipped past the roller to enter the channel 100 defined between the reinforcing member 60 and the outer periphery of the hook 20. As soon as the wire has slipped past the roller 66, the reinforcng member 60 elastically returns to its initial position 68 wherein the roller 66 is closely spaced from the second segment 34 and the distance separating them is less than the thickness of the wire 18 to thereby prevent the accidental escape of the wire. The fillets 72 and 74 which reinforce the member 60 encourage the elastic flexiblity already described and assist the member 60 in returning to the position 68. In addition, the flexibly movable characteristic of the wire retaining hook 20 permits the hook to move slightly inward toward face 12 toward position 110 as the wire is inserted between roller 66 and the second segment 34, thereby further facilitating insertion of the wire. The hook 20 returns to its rest position after the wire has passed the roller 66. This cooperation between the hook reinforcing member 60 and the wire retaining hook 20 substantially increases the ease with which wire may be inserted past roller 66 and is particularly desirable when hundreds of such insulators are to be installed along a lengthy fence line.

After the wire has been slipped into the channel 100 located between the wire retaining hook 20 and the reinforcing member 60, it may be easily moved therealong and up the vertical channel 102 between the fourth segment 38 and face 12.

The operator next moves the fence wire upwardly along the vertical channel 102 until the wire reaches the locking portion 42. At this point, the operator slides and rolls the wire between the locking portion 42 and the first segment 32, starting the wire at the wider end of the wire insertion slot 40, which is located at lateral side 44 (FIG. 3). The widened end of slot 40 permits the wire to be more easily started and the moving wire has a wedge effect as it moves along the portion 42 and is more easily inserted. The hook 20 is displaced from the rest position 104 to the extended position 106 (FIG. 2) as the wire slips past the slot 40 and into the chamber 48. The hook 20 now returns to its rest position 104, causing the slot 40 to become substantially more narrow and sufficiently narrow as to prevent the accidental escape of the wire 18 from the chamber 48.

The gussets 50 and 52 which extend between the face 12 and the first segment 32 substantially reduce upward movement of the segment 32, causing most of the flexing movement of the wire retaining hook to occur in segments 34, 36 and 38. The fillet 56 extending between the first and second segments reinforces and assists the return of the second segment 34 to rest position 104.

With the described insulators 10 and 11 the operator may easily install the fence wire on the insulator even when the insulator has been already attached to a fence post, and the insertion of the wire may be accomplished without reorienting the wire from its normal horizontal position. Most commercially available insulators have been constructed to require the fence wire to be oriented vertically to slip between generally vertical fingers in order to be attached to the insulator. Accordingly the present invention provides an apparatus which greatly reduces the twisting, turning and vertically reorienting of the wire and permits replacement of insulators even on a tightly strung, taut fence wire where earlier known insulators would have been extremely difficult to install. The disclosed invention, which has adjoining channels 100 and 102, insertion slot 40 and chamber 48, all of which permit continuous movement of a fence wire therealong when the fence wire is in generally horizontal condition, thus provides a very easily installed insulator for both newly constructed fences and repair of already constructed fence lines.

The fence wire 18 may be removed from the insulator 10 or 11 by simply reversing the installation procedure already described in conjunction with insertion of the wire.

When the wire 18 is installed in the insulator 10 or 11 and the insulator mounted on a fence line, the wire and insulator are commonly subjected to physical impact by livestock striking the wire or applying their weight against the insulator. Ordinarily, the insulator is installed so than its face 12 faces or confronts the interior of the fence wherein the livestock are contained.

Livestock can easily become caught in the fence and this is particularly common where barbed wire is used. When the livestock become engaged with the fence, they frequently pull inwardly to release themselves, and this results in a force vector 112 (FIG. 5) being applied to the wire retaining hook 20 and the urging of the hook 20 outwardly toward roller 66 and to extended position 106. In the position 106 the wire retaining hook 20 bears against and contacts the reinforcing member 60 and the hook 20 and reinforcing member cooperate to resist further movement of the hook toward the reinforcing member as the force 112 is applied to the hook by the fence wire 18. When the force 112 is removed, the wire retaining hook moves back to its rest position 104, the gussets 50 and 52 and fillets 54 and 56 assisting in the maintaining of a well-defined rest position 104, as already described in conjunction with the movement of the hook to position 106 when the wire 18 was inserted through the slot 40.

When the livestock move against the fence and urge the fence wire in the direction of face 12, the wire 18 transmits a force 108 (FIG. 6) to the wire retaining hook 20. Application of the force 108 causes the wire retaining hook to move from its rest position 104 to the extended position 110 where the fourth segment 38 contacts the face 12 and the face and wire retaining hook 20 cooperate to resist further movement of the hook 20 in the direction 108. In the process of moving from rest position 104 to the position 110, the insertion slot 40 further narrows in width, thereby decreasing the possibility of the wire escaping through the slot. When the force 108 is removed, the hook 20 returns to its rest position 104. The flexible material used in the construction of the insulator thus permits the free movement between rest and extended positions to greatly reduce the likelihood of insulator snapping or fatigue and substantially increasing its use life.

Accordingly, the present invention provides a substantially improved insulator which permits a fence wire to be easily and rapidly inserted or removed even when the insulator is mounted in a fence line, and further provides an insulator which is highly resistant to forces applied to it by livestock contact with the fence.

While the preferred embodiment of the present invention has been described, it should be understood that various changes, adaptations and modifications may be made therein without departing from the spirit of the invention and the scope of the appended claims.

What is claimed is:

1. An insulator mountable on a fence post and capable of supporting and retaining an electrically conductive fence wire and withstanding repeated pushing and pulling on the fence wire by livestock without releasing the wire, comprising:

an insulator body formed of insulative material and including fence post mounting means for mounting said insulator body on the fence post;

said insulator body further including a face and an impact absorbing fence wire retaining hook fixed to and extending outwardly from the junction of said hook and said face and capable of receiving and retaining the fence wire therein, said hook being formed of elastically flexible material so as to be flexibly movable between a rest position adjacent said face and an extended position;

said insulator body further including a reinforcing member fixed to and extending outwardly from said face, said member being closely spaced from and confronting said wire retaining hook when said hook is in rest position and at least partially encompassing said hook;

said wire retaining hook contacting and bearing against said reinforcing member when said hook is in extended position and said hook and said reinforcing member cooperating to resist further movement of said hook toward said reinforcing member as force is applied to said hook by the wire when livestock exert force on the fence wires; and said wire retaining hook having a generally spiral configuration and extending outwardly, cantileverly from said junction and then returning toward said junction, with the terminal end of said spiral configuration being closely spaced from said junction of said hook with said face.

2. An insulator mountable on a fence post and capable of supporting and retaining an electrically conductive fence wire and withstanding repeated pushing and pulling on the fence wire by livestock, comprising:

an insulator body formed of insulative material and including fence post mounting means for mounting said insulator body on the fence post;

said insulator body further including a face and an impact absorbing fence wire retaining hook fixed to and extending outwardly from the junction of said hook and said face and capable of receiving and retaining the fence wire therein, said hook being formed of elastically flexible material so as to be flexibly movable between a rest position adjacent said face and an extended position;

said insulator body further including a reinforcing member fixed to and extending outwardly from said face, said member being closely spaced from and confronting said wire retaining hook and at least partially encompassing said hook;

said wire retaining hook contacting and bearing against said reinforcing member when said hook is in extended position and said hook and said reinforcng member cooperating to resist further movement of said hook toward said reinforcing member as force is applied to said hook by the wire when livestock exert force on the fence wire; and said wire retaining hook including a first segment fixed to and extending outwardly from said face, a second segment fixed to and extending transversely downwardly from said first segment, a third segment fixed to and extending transversely from said second segment and toward said face, and a fourth segment fixed to and extending transversely upwardly from said third segment, spaced from said face and ending in a terminal end with said terminal end closely spaced from said first segment to define a wire insertion slot between said terminal end and said first segment, said slot having a width less than the thickness of the wire to be retained to permit the fence wire to be forced through said slot and within said hook as said hook moves to said extended position.

3. The insulator of claim 2 and further including support means extending between said face and said first segment to inhibit movement of said first segment in directions transverse to said first segment.

4. The insulator of claim 3 wherein said support means includes a pair of spaced apart generally upright gussets.

5. The insulator of claim 2 wherein:
said terminal end includes a locking portion spaced from and confronting said first segment, the distance of separation between said first segment and said locking portion defining the width of said insertion slot; and
said locking portion being angled relative to said first segment so as to cause the width of said insertion slot to decrease from one lateral side of said terminal end to the opposite lateral side of said terminal end with maximum width occuring at one lateral side and minimum width occurring at the opposite lateral side to thereby permit the fence wire to be more easily inserted through said insertion slot and into said hook by starting it at said maximum width said of said slot and moving it along said slot and toward said minimum width side as the wire is moved through said slot and into said hook, said hook moving from said rest position toward said extended position to increase the width of said insertion slot during insertion.

6. The insulator of claim 5 wherein said terminal end is generally arcuate to provide a ramp along which the fence wire may slide and roll when inserting the wire into and removing it from said wire retaining hook.

7. The insulator of claim 2 wherein said fence wire retaining hook is elastically flexibly movable between said rest position and a second extended position wherein said hook is moved against and contacts said face and is supported and reinforced by said face, said hook and said face cooperating to resist further movement of said hook toward said face as force is applied to said hook by the fence wire when livestock exert force on the fence wire, said width of said wire insertion slot being thereby reduced to better retain the wire in said hook.

8. The insulator of claim 2 wherein said reinforcing member includes:
an elongated arm extending generally outwardly from said face and parallel to and spaced from said third segment of said hook; and
a reinforcing bar extending transversely from said elongated arm and positioned parallel to and closely adjacent said second segment of said hook.

9. The insulator of claim 8 wherein:
said reinforcing member includes combined guide and lock means on said reinforcing bar and extending toward said second segment;
said guide and lock means of said reinforcing bar when in said initial position being spaced from said second segment of said wire retaining hook by a distance less than the thickness of the fence wire to thereby prevent movement of the wire past said guide and lock means and away from said insulator body; and
said guide and lock means being contoured to define a ramp to permit rolling and sliding of the wire along and past said guide and lock means and thence between said hook and said reinforcing member.

* * * * *